United States Patent
Rae et al.

(10) Patent No.: US 7,059,414 B2
(45) Date of Patent: Jun. 13, 2006

(54) ACIDIZING STIMULATION METHOD USING A PH BUFFERED ACID SOLUTION

(75) Inventors: Philip James Rae, Landridge Condo (SG); Gino Di Lullo Arias, Rio de Janerio (BR); Atikah Bte Ahmad, Buena Vista Gardeo (SG); Leonard J. Kalfayan, Houston, TX (US)

(73) Assignee: BJ Services Company, Houston, TX (US)

( * ) Notice: Subject to any disclaimer, the term of this patent is extended or adjusted under 35 U.S.C. 154(b) by 138 days.

(21) Appl. No.: 10/624,185

(22) Filed: Jul. 22, 2003

(65) Prior Publication Data

US 2005/0016731 A1    Jan. 27, 2005

(51) Int. Cl.
*E21B 37/06* (2006.01)
(52) U.S. Cl. .................. 166/304; 166/300; 166/307; 166/312
(58) Field of Classification Search .............. 166/300, 166/304, 307, 311, 312; 507/238, 267, 277
See application file for complete search history.

(56) References Cited

U.S. PATENT DOCUMENTS

| | | | |
|---|---|---|---|
| 2,652,360 A | 9/1953 | Bond et al. | |
| 2,742,425 A | 4/1956 | Holbrook | |
| 2,885,004 A | 5/1959 | Perry | |
| 3,828,854 A | 8/1974 | Templeton et al. | |
| 3,868,996 A * | 3/1975 | Lybarger et al. | 166/250.01 |
| 3,889,753 A | 6/1975 | Richardson | |
| 3,934,651 A | 1/1976 | Nierode et al. | |
| 3,953,340 A | 4/1976 | Templeton et al. | |
| 4,090,563 A | 5/1978 | Lybarger et al. | |
| 4,096,914 A | 6/1978 | McLaughlin et al. | |
| 4,122,896 A | 10/1978 | Scheuerman et al. | |
| 4,137,972 A | 2/1979 | McLaughlin et al. | |
| 4,261,421 A | 4/1981 | Watanabe | |
| 4,267,887 A | 5/1981 | Watanabe | |
| 4,304,676 A | 12/1981 | Hall | |
| 4,480,694 A | 11/1984 | Watanabe | |
| 4,487,265 A | 12/1984 | Watanabe | |

(Continued)

FOREIGN PATENT DOCUMENTS

WO    WO 01/02698 A1    1/2001

(Continued)

OTHER PUBLICATIONS

Fredd, C.N. et al., *Alternative Stimulation Fluids and Their Impact on Carbonate Acid*, 1996, Society of Petroleum Engineers (Paper No. 31074).

(Continued)

*Primary Examiner*—Zakiya W. Bates
(74) *Attorney, Agent, or Firm*—Jones & Smith, LLP; John Wilson Jones

(57) ABSTRACT

A method of stimulating subterranean formations in oil and gas wells using a high pH buffered acid system. The method may be used to treat sandstone formations wherein the pH buffered acid system is used as the preflush or overflush or both. The method consists of introducing into the well a hydrofluoric acid containing sandstone acidizing solution either prior to or subsequent to introduction of the pH buffered acid system. The pH buffered acid system may further be used in the treatment of carbonate reservoirs. The pH of the buffered acid solution is substantially equivalent to that of the pH of the acidizing solution. The buffered acid solution is void of either hydrofluoric acid or hydrofluoric acid precursors.

29 Claims, 1 Drawing Sheet

U.S. PATENT DOCUMENTS

| | | |
|---|---|---|
| 4,548,732 A | 10/1985 | Scheuerman et al. |
| 4,646,835 A | 3/1987 | Watkins et al. |
| 4,648,456 A | 3/1987 | Lamb et al. |
| 4,703,803 A | 11/1987 | Blumer |
| 4,739,833 A | 4/1988 | Watanabe et al. |
| 4,877,459 A | 10/1989 | Cockrell, Jr. et al. |
| 5,031,700 A | 7/1991 | McDougall et al. |
| 5,039,434 A | 8/1991 | Watkins et al. |
| 5,082,058 A | 1/1992 | Blumer |
| 5,529,125 A | 6/1996 | Di Lullo Arias et al. |
| 5,979,556 A | 11/1999 | Gallup et al. |
| 6,308,778 B1 | 10/2001 | Girgis-Ghaly et al. |
| 6,443,230 B1 | 9/2002 | Boles et al. |
| 6,531,427 B1 | 3/2003 | Shuchart et al. ............ 507/267 |
| 2002/0070022 A1 | 6/2002 | Chang et al. |

FOREIGN PATENT DOCUMENTS

WO      WO 01/83639 A2    11/2001

OTHER PUBLICATIONS

Van Domelen, M.S. et al., *Alternate Acid Blends for HPHT Applications*, 1995, Society of Petroleum Engieers (Paper No. 13563).

Scheueman, R.F., *A Buffer-Regulated HF Acid for Sandstone Acidizing to 550 Degree*, 1988, Society of Petroleum Engineers (Paper No. 30419).

Smith, C.F., *Fracture Acidizing in High Temperature Limestone*, 1970, American Institute of Mining.

*BJ $S^3$ Acid™ System*, Product Information, BJ Services Company, 2002.

*BJSandstone Acid$^{SM}$ System*, Product Information, BJ Services Company, 1996.

\* cited by examiner

ACIDIZING STIMULATION METHOD USING A PH BUFFERED ACID SOLUTION

FIELD OF THE INVENTION

The invention relates to a method of stimulating sandstone formations of oil and gas wells by use of a buffered organic acid solution and a sandstone acidizing solution containing hydrofluoric acid. The buffered organic acid solution may be used as a pre-flush and/or overflush to the sandstone acidizing solution. The buffered organic acid solution may further be used for stimulating carbonate formations, such as limestone, chalk or dolomite.

BACKGROUND OF THE INVENTION

Subterranean sandstone or siliceous formations in oil and gas wells have been treated in the past with acid treatments to increase their permeability, thus increasing or improving production from the formation. As used herein the term "siliceous" refers to the characteristic of having silica and/or silicate. Most sandstone formations are composed of over 50–70% sand quartz particles, i.e. silica ($SiO_2$) bonded together by various amounts of cementing material including carbonate (calcite or $CaCO_3$) and silicates. The acid treatment of siliceous formations should be distinguished from the acid treatment of carbonate formations. Carbonate formations can be treated with a variety of acid systems, including hydrochloric, acetic and formic acids, often with similar success. The treatment of siliceous formations with these acids, however, may have little or no effect because they do not react appreciably with the silica and silicates which characterize the sandstone formations.

By far the most common method of treating sandstone formations involves introducing corrosive, very low pH acids into the wellbore and allowing the acid to react with the surrounding formation. Such acids are often referred to as "mud acids" and are characterized by a pH of less than zero. Mixtures of hydrofluoric acid and hydrochloric acid are the generally preferred mud acids because of the reactivity of HF acid with silica and silicates. Hydrochloric acid is required to maintain a low pH as hydrofluoric acid spends, retaining certain dissolved species in solution. The silicates include clays and feldspars. Hydrofluoric acid tends to react very quickly with authigenic clays, such as smectite, kaolinite, illite and chlorite, especially at temperatures above 150° F., as a function of mineral surface area. Because of this quick reaction, acid may penetrate only a few inches into the formation before HF is spent. Simultaneously, precipitation of various aluminum and silicon complexes occur as a result of the reaction of the acid with the siliceous minerals. The precipitation products plug pore spaces and reduce the porosity and permeability of the formation, thus impairing flow potential. Because clays are normally a part of the cementitious material that holds the sandgrains of sandstone formations together, the dissolution of clay also weakens and de-consolidates the sandstone matrix in the vicinity of the wellbore, thus causing damage to the formation. The damaging effects due to both the de-consolidation of the matrix and the precipitation of complexes which clog the pore spaces of the formation can eliminate or even revert the stimulation effect of the acid treatment. Means of reducing the reaction rate of HF within the area surrounding the wellbore consist of the slow hydrolysis of ammonium bifluoride to convert it to HF, either at the surface or within the well. While such methods allow the acid to penetrate slightly further into the formation, they do not eliminate precipitates from forming and clogging the matrix.

More recently, acidizing systems have been developed that employ organic acids, in place of all, or part, of the hydrochloric or hydrofluoric acid. U.S. Pat. No. 5,529,125 discloses a method of treating siliceous or sandstone formations using a treatment solution containing, in addition to hydrofluoric acid, a phosphonate compound. Such compositions reduce the amount of precipitates produced and inhibit or retard the reactivity of the hydrofluoric acid with the clay or silicate elements of the formation. Further, U.S. Pat. No. 6,443,230 discloses use of a treatment solution containing citric acid, a phosphonate and hydrofluoric acid to enhance the productivity of hydrocarbons from such siliceous formations. The pH of such acid mixtures is generally much higher than conventional mud acids, being generally in the range of pH 3.2 to about 4.8, yet these systems have the same dissolving capability with respect to siliceous minerals as mud acids. This elevated pH has obvious advantages in terms of corrosion and general reactivity, allowing deeper matrix penetration of live acid and reduced requirements for corrosion inhibitors. Other advantages of these higher pH formulations include reduced risk to surface equipment including pipelines, reduced risk to the environment and personnel, reduced chemical requirement for neutralization, reduced risk of creating sludges and emulsions and reduced risk of upset to process facilities.

These advantageous properties are, to a large extent, negated by the routine practice of utilizing preflushes and/or overflushes consisting of hydrochloric acid, with a pH of less than zero. One reason for pumping these flushes is to dissolve carbonate minerals within a certain distance of the wellbore, prior to injecting the HF-containing acidizing solution, thereby minimizing the risk of damage that could be caused by precipitating insoluble calcium fluoride. Another reason is to maintain low pH conditions to remove protective films that can form on some formation minerals or to reduce iron hydroxide precipitation. Generally, these flushes do not spend completely and typically return, upon flowback, with a persisting low pH. This can result in corrosion of downhole tubular goods (including coiled tubing) and surface equipment.

One explanation for this is that much of the corrosion inhibitor has been adsorbed onto formation minerals, like clays, and does not return with the partially spent acid. Thus, from the corrosion standpoint alone, novel methods of treating sandstone and siliceous formations, as well as for treating carbonate formations, are needed. In acid stimulation of carbonates, the moderated reactivity of a buffered acid solution additionally provides more uniform treatment of the target interval, as well as beneficially creating a greater number of more highly branched flow channels (called "wormholes"), relative to what can be achieved with traditional acid treatment using hydrochloric acid or unbuffered organic acid solutions.

SUMMARY OF THE INVENTION

The invention provides a novel method of stimulating sandstone formations of oil and gas wells which does not limit the dissolving power of the HF acidizing system and does not result in loss of retention of acid reaction products in solution.

The method consists of use of high pH buffered acid system for use as the preflush or overflush or both. As such, the method of the invention employs a high-pH acid system throughout the acid treatment of the siliceous formation. The method of the invention consists of introducing into the well a hydrofluoric acid containing sandstone acidizing solution. A buffered acid solution is further employed as either a preflush or as an overflush or as both a preflush and a overflush. The pH of the buffered acid solution is substantially equivalent to that of the pH of the HF acidizing solution. The buffered acid solution is void of either hydrofluoric acid or hydrofluoric acid precursors, such as ammonium bifluoride, ammonium fluoride, or organic or inorganic chlorides.

The use of a HF containing sandstone acidizing solution and a buffered acid preflush and/or overflush comprises a unique and complete acidizing treatment method. As such, the method of the invention proceeds at increased pH levels than those disclosed in the prior art.

The invention further provides a novel method of treating a carbonate reservoir by introduction of the high pH buffered acid system into the reservoir.

The method of the invention provides numerous advantages over the prior art such as environmental biodegradability, low corrosivity, and compatibility with iron and steel, and special alloy tubulars, especially at elevated downhole temperatures.

BRIEF DESCRIPTION OF THE DRAWINGS

In order to more fully understand the drawings referred to in the detailed description of the present invention, a brief description of each drawing is presented, in which.

DETAILED DESCRIPTION OF PREFERRED EMBODIMENTS

Figure 1:
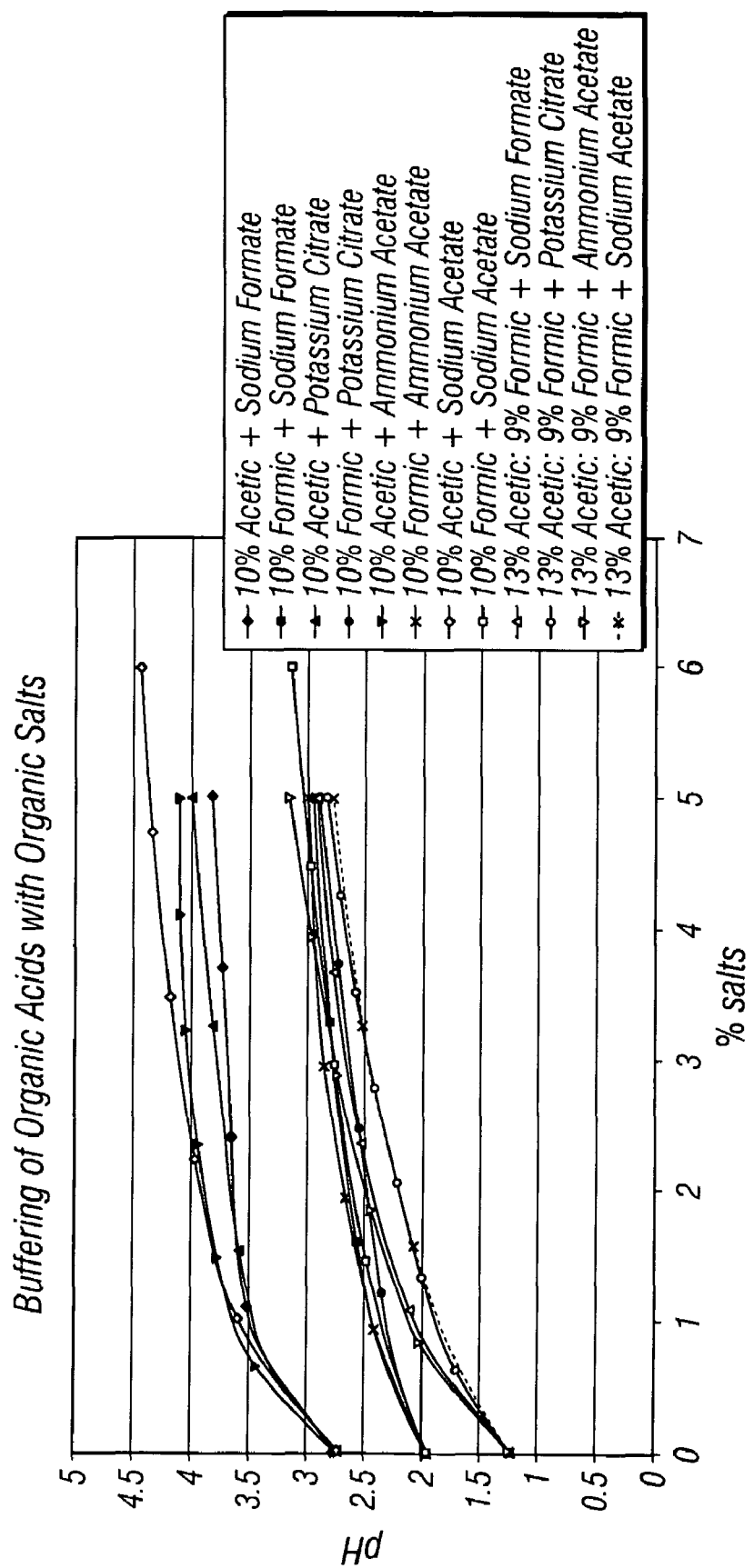
FIG. 1 depicts the buffering effect on pH of buffered acid solutions used in accordance with the invention.

Sandstone formations of oil and gas wells may be stimulated without recourse to the extremely corrosive and highly acid containing systems of the prior art. The method of the invention consists of introducing into the reservoir a high pH buffered acid system. The high pH buffered acid system may be introduced into either a sandstone formation or a carbonate formation.

When used with sandstone formations, the high pH buffered acid system is used as a preflush or overflush to a HF acid containing sandstone acidizing solution. When used as a preflush to the HF acid containing sandstone acidizing solution, the high pH buffered acid system serves, at least partially, to remove carbonates prior to introduction of the HF acid containing acidizing solution.

The amount of HF in the acidizing solution is generally between from about 0.5 to about 6.0 weight percent. (HF acid is by definition, a weak acid, being only partially dissociated in water, pKa=3.19.) In a preferred mode, the acidizing solution further contains an organic acid. Sandstone acidizing solutions containing organic acids often produce a delayed reaction on clay minerals, significantly slowing the HF acid reaction rate. Suitable as the sandstone acidizing solution are those acid systems known in the art for dissolving the silicate and clay formations of the sandstone to increase its permeability.

Especially preferred are those acidizing solutions described in U.S. Pat. No. 5,529,125, herein incorporated by reference. Such acidizing solutions contain phosphonate acids and salts as well as esters thereof. Such systems may contain phosphonate materials of the formula:

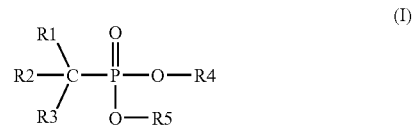

wherein R1, R2 and R3 may be hydrogen, alkyl, aryl, phosphonates, phosphates, acyl amine, hydroxy and carboxyl groups and R4 and R5 may consist of hydrogen, sodium, potassium, ammonium or an organic radical. The concentration of the phosphonate acid in the acidizing solution is generally between from about 0.25 to about 6.0, preferably about 3, percent by volume of the total solution without regard to the HF acid concentration.

Examples of these materials include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt. Among the commercial phosphonate materials, preferred are amino phosphonic acids, such as 1-hydroxyethylidene-1,1-diphosphonic acid, otherwise known as "HV acid," available in 60% strength as "DEQUEST 2010" from Monsanto Co, Such phosphonate materials are used in conjunction with hydrofluoric acid or hydrochloric acid or such conventional acid systems as hydrochloric/hydrofluoric acid systems and organic/hydrofluoric acid systems which include formic/hydrofluoric acid mixtures and include fluoroboric acid solutions, hydrochloric acid and hexafluorophosphoric acid mixtures as well as retarded hydrofluoric acid systems consisting of 12% hydrochloric acid and 3% hydrofluoric acid using ammonium bifluoride as the source of hydrofluoric acid and an aluminum salt as a retarder.

The acidizing solution for use in the invention may further include an organic acid, such as citric acid, acetic acid, or formic acid as well as those set forth in U.S. Pat. No. 6,443,230, herein incorporated by reference.

A particularly preferred sandstone acidizing solution for use in the invention is BJ Sandstone Acid solution, a product of BJ Services Company.

Prior and/or subsequent to introduction of the HF containing sandstone acidizing solution into the well, a pH buffered acid solution is introduced into the well. The pH buffered acid solution may further be used to treat a carbonate formation. Naturally, the HF containing sandstone acidizing solution is not used in the treatment of carbonate formations.

The buffered acid solution, generally having a pH substantially equivalent to that of the acidizing solution. When used in sandstone formations, the buffered acid solution may be employed prior to introduction of the acidizing solution or subsequent to the introduction of the acidizing solution into the well.

The buffered acid solution, typically, has a pH of at least 3.2 and generally has a pH from about 3.2 to about 4.8. The pH of the buffered acid solution is substantially equivalent to that of the pH of the sandstone acidizing solution.

The pH buffered acid solution is void of HF and preferably does not contain any other inorganic acid such as HCl. At the most, no more than 3 weight percent HCl should be included in the buffered acid solution. Generally, the buffered acid solution typically contains (i.) at least one organic acid and (ii.) at least one organic acid salt. The organic acid of the organic acid salt may be the same or different from the organic acid per se. Most organic acids are incompletely dissociated in water, resulting in higher pHs at a given molar concentration, compared to a fully dissociated mineral acid, such as HCl.

Generally, the molar ratio of organic acid:salt of organic acid is between from about 30:1 to about 1:5 and the amount of composite organic acid and salt of organic acid in the pH buffered acid solution is between from about 1 to about 20 weight percent.

Preferred as the organic acid and the organic acid of the organic salt are those organic weak acids independently selected from acetic acid, formic acid, citric acid, lactic acid, fumaric acid, propionic acid, butyric acid, chloroacetic acid, edetatic acid, pentateic acid as well as mixtures thereof.

FIG. 1 demonstrates the buffering effect on pH of buffered acid solutions containing acetic acid and formic acid and mixtures thereof and sodium, potassium and ammonium salts of formic acid, citric acid and acetic acid. The pKa of formic acid and acetic acid is 3.74 and 4.74, respectively. The pH of an unbuffered 10% acid solution containing these organic acids is 1.97 and 2.74, respectively. As illustrated in FIG. 1, the pH of the buffered solutions, containing these same acids at the same concentrations, is between from about 2.0 to about 4.5, respectively. In a preferred mode, the pH of the buffered acid solution is between from about 3.2 to about 4.8, most preferred from about 3.5 to about 4.5. These values are dramatically higher than the pH of 15% HCl (pH=−0.65).

By appropriate combinations of organic acid salts and organic acids, a buffered acid solution can be obtained whose pH is quasi-equivalent to the pH of HF containing sandstone acidizing solution, including those containing an organic acid or HCl, such as BJ Sandstone Acid. FIG. 1 graphically illustrates the buffering effect with organic acid salts and organic acids and, in particular, shows the typical range of concentration of a variety of buffering salts with various organic acids and the effect of these concentrations on buffered pH. These acids have hydrogen ion concentrations that are some 10,000–100,000 times lower than mineral acids, such as HCl. As an example, a 10% acetic acid solution containing 3% by weight ammonium acetate has a pH of about pH 4.1. While ammonium salts are preferred in applications where HF-based acids are likely to be used in tandem with the buffered acids, similar buffering phenomena are also observed with alkali-metal salts like sodium and potassium. The solubility of calcium carbonate in various acids and buffered acids is further shown in Table I below:

TABLE I

| % NH$_4$AC added | | CaCO$_3$ dissolved/100 ml | Lb/gal |
|---|---|---|---|
| 0 | | 2.7 | 8.03 | 0.670 |
| 1 | | 3.69 | 8.02 | 0.669 |
| 3 | | 4.2 | 8.06 | 0.672 |
| 10% FORMIC | | | | |
| 0 | | 1.62 | 10.09 | 0.842 |
| 1 | | 2.31 | 10.06 | 0.839 |
| 3 | | 2.84 | 10.10 | 0.842 |
| 0 | | 1.46 | 17.894 | 1.49 |
| 1 | | 2.21 | 17.823 | 1.49 |
| 3 | | 2.86 | 17.728 | 1.48 |

Further, the invention relates to formulation of a blended concentrate which, when diluted, yields a buffered acid solution suitable for field use. For example, a blend of glacial acetic acid and ammonium acetate may render, upon dilution, a buffered acid solution suitable for use as a preflush or overflush in dissolving acid soluble siliceous material in a sandstone formation of an oil or gas well. Such blends render mixing of individual components in the field unnecessary.

Further, the use of a buffered acid solution as a preflush or overflush, while being more expensive than inorganic acids like hydrochloric acid, offers additional benefits in sandstone formations. For instance, HCl is generally available commercially at strengths of 32 to 34% w/w and, in any case, cannot be obtained at strengths greater than 36% w/w. Acetic acid, on the other hand, is usually supplied at concentrations of 100%, and formic acid at concentrations exceeding 90%. Thus, even allowing for these acids' lower efficiency in dissolving carbonate rock, they are more efficient from a packaging, transportation and generally logistics perspective. For comparison purposes, a single 55 gal drum of glacial acetic acid could be used to prepare 572 gals of 10% acetic acid, which would dissolve some 396 lbs. of carbonate. The same drum of 32% HCl would prepare only 194 gals. of 10% HCl capable of dissolving only 219 lbs. of carbonate.

The benefits of the method of the invention are numerous since the acid systems of the invention use acids (i.) with exceptional low corrosivity requiring much less corrosion inhibitor; (ii) that reduce the risk of wellbore damages, particularly from emulsions and iron precipitates; (iii) that are biodegradable; (iv) that are inherently compatible with chrome steel and other exotic metallurgy (no risk of chloride stress corrosion); (v) that, once prepared, are much less dangerous to personnel and equipment than mineral acids; (vi) that have less requirement to be neutralized prior to disposal or export to production plant facilities via pipeline, etc. because of their benign nature, etc.; (vii) that are still capable of dissolving the requisite amounts of carbonate rock without compromising the main HF treatment; and (viii) using acids with inherent iron control properties (owing to buffering or other effects when citrates, erythorbates, ascorbates, etc. are used as one, or all, of the buffering salts).

Applications exist for formulations buffered with sodium and potassium salts in cases where carbonate formations, or sandstone formations with high calcite levels are encountered. Despite their elevated pH, these buffered acid solutions are capable of dissolving essentially the same amount of carbonate mineral as the unbuffered acids.

From the foregoing, it will be observed that numerous variations and modifications may be effected without departing from the true spirit and scope of the novel concepts of the invention.

What is claimed is:

1. A method for dissolving acid-soluble siliceous material in a sandstone formation of an oil or gas well which comprises:
    (a) introducing into the well a buffered acid solution containing an organic acid, the buffered acid solution being void of hydrofluoric acid or a hydrofluoric acid precursor; and
    (b) introducing into the well an HF-containing sandstone acidizing solution wherein the pH of the buffered acid solution has pH substantially equivalent to that of the acidizing solution.

2. The method of claim 1, wherein the pH of the buffered acid solution is between from about 1.9 to about 4.8.

3. The method of claim 2, wherein the pH of the buffered acid solution is from about 3.2 to about 4.5.

4. The method of claim 1, wherein the buffered acid solution contains less than about 3 weight percent of HCl.

5. The method of claim 1, wherein the buffered acid solution does not contain an inorganic acid.

6. The method of claim 1, wherein the sandstone acidizing solution further comprises a phosphonate of the formula:

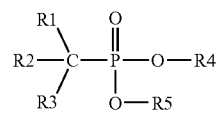

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical.

7. The method of claim 6, wherein the sandstone acidizing solution further comprises citric acid or formic acid.

8. The method of claim 7, wherein the sandstone acidizing solution further comprises an ammonium salt.

9. The method of claim 1, wherein the buffered acid solution consists essentially of (i.) an organic acid and (ii.) an organic acid salt.

10. The method of claim 9, wherein the organic acid of the organic acid salt is the same or different from the organic acid of (i.).

11. The method of claim 1, wherein the buffered acid solution comprises an organic acid and a salt of an organic acid.

12. The method of claim 11, wherein the organic acid and the organic acid of the organic salt are independently selected from acetic acid, formic acid, citric acid, lactic acid, fumaric acid, propionic acid, butyric acid, chloroacetic acid, edetatic acid, pentateic acid or a mixture thereof.

13. The method of claim 1, wherein the buffered acid solution comprises an organic acid selected from acetic acid, formic acid, citric acid or a mixture thereof and a salt of acetic acid, formic acid, citric acid or a mixture thereof.

14. The method of claim 13, wherein the organic acid salt is a sodium, potassium, or ammonium salt of acetic acid, formic acid, citric acid or a mixture thereof.

15. The method of claim 1, wherein the sandstone acidizing solution comprises about 1 to about 50 weight percent citric acid, up to about 20 weight percent HF and from about 0.5 to about 50 weight percent phosphonate compound.

16. A method for dissolving acid soluble siliceous material in a well which comprises:
  (a) introducing into the well a HF containing acidizing solution having a pH of between from about 1.9 to about 4.5; and
  (b) prior to and/or subsequent to step (a) introducing into the well a buffered acid solution, void of hydrofluoric acid, having a pH of from about 1.9 to about 4.5.

17. The method of claim 16, wherein the pH of the acidizing solution and the pH of the buffered acid solution are substantially equivalent.

18. The method of claim 16, wherein the buffered acid solution comprises an organic acid and a salt of an organic acid and further wherein the organic acid and the organic acid of the organic salt are independently selected from acetic acid, formic acid, citric acid, lactic acid, fumaric acid, propionic acid, butyric acid, chloroacetic acid, edetatic acid, pentateic acid or a mixture thereof.

19. The method of claim 18, wherein the acidizing solution further comprises a phosphonate of the formula:

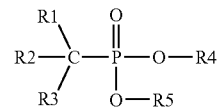

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical.

20. A method for removing carbonate materials or scale deposition from a subterranean formation of an oil or gas well which comprises introducing into the well a buffered acid solution containing an organic acid and void of hydrofluoric acid or a hydrofluoric acid precursor wherein the pH of the buffered acid solution is generally between from about 1.9 to about 4.8.

21. The method of claim 20, wherein the subterranean formation is a sandstone.

22. The method of claim 20, wherein the subterranean formation is a carbonate.

23. The method of claim 20, wherein the pH of the buffered acid solution is between from about 3.2 to about 4.8.

24. The method of claim 20, wherein the buffered acid solution contains less than about 3 weight percent of HCl.

25. The method of claim 20, wherein the buffered acid solution does not contain an inorganic acid.

26. The method of claim 20, wherein the buffered acid solution comprises an organic acid and a salt of an organic acid.

27. The method of claim 26, wherein the organic acid and the organic acid of the organic salt are independently selected from acetic acid, formic acid, citric acid, lactic acid, fumaric acid, propionic acid, butyric acid, chloroacetic acid, edetatic acid, pentateic acid or a mixture thereof.

28. The method of claim 20, wherein the buffered acid solution comprises an organic acid selected from acetic acid, formic acid, citric acid or a mixture thereof and a salt of acetic acid, formic acid, citric acid or a mixture thereof.

29. The method of claim 28, wherein the organic acid salt is a sodium, potassium, or ammonium salt of acetic acid, formic acid, citric acid or a mixture thereof.

* * * * *